Aug. 7, 1962             DU BOIS EASTMAN            3,048,481
METHOD OF FORMING GAS TIGHT SEAL BETWEEN VESSEL WALL
AND REFRACTORY LINING OF A SYNTHESIS GAS GENERATOR
Filed June 18, 1958
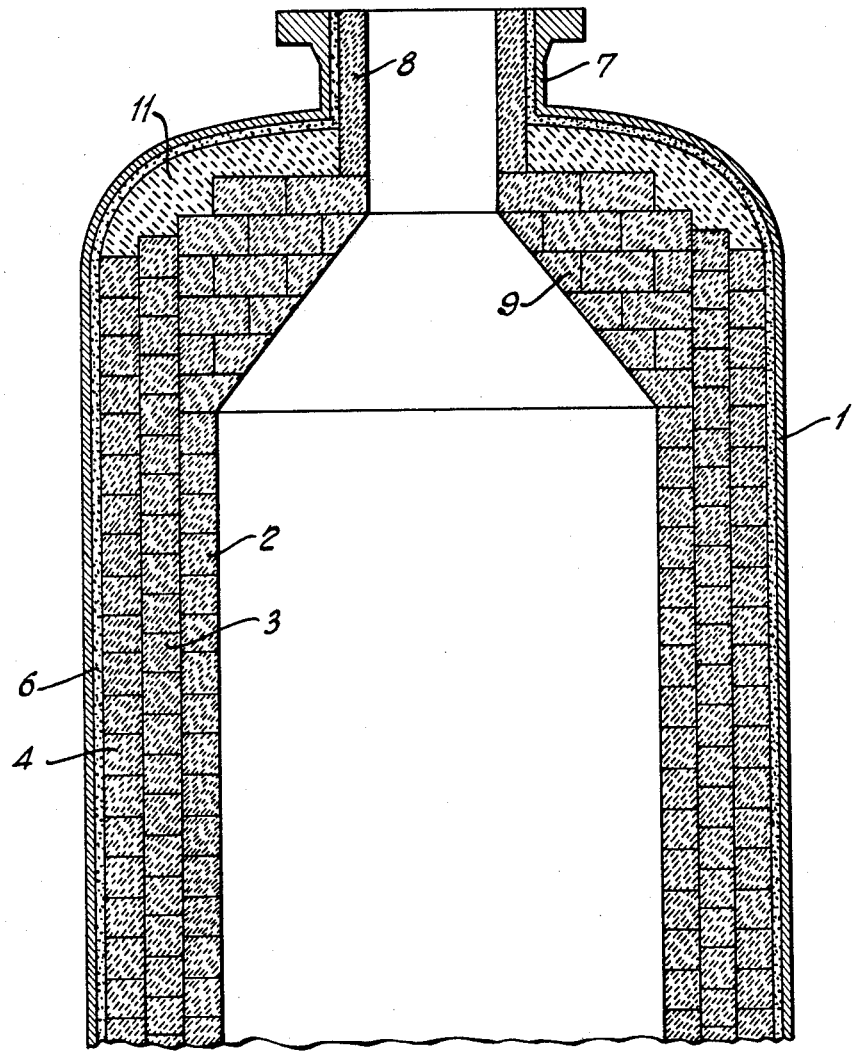

United States Patent Office 3,048,481
Patented Aug. 7, 1962

3,048,481
METHOD OF FORMING GAS TIGHT SEAL BETWEEN VESSEL WALL AND REFRACTORY LINING OF A SYNTHESIS GAS GENERATOR
Du Bois Eastman, Whittier, Calif., assignor to Texaco Inc., a corporation of Delaware
Filed June 18, 1958, Ser. No. 742,810
1 Claim. (Cl. 48—206)

This invention relates to high temperature combustion apparatus and the production of high temperature gases at elevated pressure, in particular for the production of synthesis gas by partial combustion of carbonaceous fuels under elevated pressure. More particularly, this invention relates to apparatus for the production of synthesis gas comprising a refractory lined metal pressure vessel, and to a method of forming a gas-tight seal between said refractory and the metal wall of said vessel. In one of its more specific aspects, this invention relates to a method of pretreating a refractory lined pressure vessel prior to generation of synthesis gas therein.

Carbonaceous fuels, including gaseous and liquid hydrocarbons and solid fuels, such as coal, coke, and lignite, may be converted to carbon monoxide and hydrogen by reaction with an oxidizing gas comprising free oxygen. Air, oxygen-enriched air, or substantially pure oxygen may be employed as the source of free oxygen. Generally, substantially pure oxygen is preferred. With the heavier carbonaceous fuels, i.e. liquid and solid fuels, it is generally desirable to react the fuel with a mixture of free oxygen and steam, whereas in the case of gaseous fuels, the presence of steam, although optional, is usually not desirable. Recently a process has been developed for non-catalytic partial oxidation reaction of carbonaceous fuels with free oxygen in a flow-type reaction zone (see, for example, U.S. Patents 2,701,756, Eastman et al., and 2,655,443, Moore).

The generation of synthesis gas by partial oxidation may be carried out at elevated pressures which may range from 100 to 1000 p.s.i.g., preferably 200 to 600 p.s.i.g., and at temperatures autogenously maintained in the range of 1800 to 3500° F., preferably within the range of 2200–3000° F. Partial oxidation of the carbonaceous fuel under these conditions effects conversion of the fuel to a product gas consisting mainly of carbon monoxide and hydrogen. Small amounts of carbon dioxide, light hydrocarbons and free carbon are generally contained in the raw product gas. More or less nitrogen, as desired, may be included in the product gas, depending upon the purity of the oxygen-containing gas initially employed.

In the generation of synthesis gas, i.e. carbon monoxide and hydrogen, by partial oxidation there is a severe problem involved in providing an effective heat insulating barrier between the reaction zone and the wall of the pressure vessel. In practice, a steel pressure vessel is employed, provided with a high temperature refractory inner wall defining the reaction zone and an intermediate filling of high temperature insulation. A combination which has been found satisfactory comprises a high purity, high density alumina liner immediately surrounding the reaction zone, and a surrounding layer or layers of alumina firebrick and alumina insulating bricks.

Although high temperature refractory brick has a fair K factor, or reasonably low conductivity, at ordinary pressures in an atmosphere of flue gases or products of complete combustion, the thermal conductivity of the refractory is considerably higher at elevated pressure in an atmosphere containing a high concentration of hydrogen. Apparently the mobility of the hydrogen molecule is largely responsible for the higher K factor, or increased thermal conductivity, of the insulating brick observed in the operation of the synthesis gas generator. As a result, it is necessary to use more than the normally indicated thickness of brick between the inner layer of brick and the wall of the reaction vessel.

Even when an adequate thickness of refractory is provided, however, it has been found in some instances that hot spots develop on the wall of the gas generator pressure vessel. These hot spots are potentially very dangerous to operating personnel at the high pressure and temperature at which the synthesis gas generators normally operate. While adequate provision is made in commercial gas generator installations for the early warning and detection of such hot spots, which effectively eliminates the danger to operating personnel, there still remains the economic detriment which results from the necessity of shutting down a synthesis gas generator which has developed a hot spot and replacing or repairing the refractory lining. It has been found in such instances that the hot spot generally is not due to spalling or failure of the refractory brickwork, but to the development of a crack or space between bricks. If gas at high temperature and pressure which finds its way through such cracks from the interior of the reaction zone to the relatively cool wall of the pressure vessel is permitted to channel along the wall of the vessel, overheating the wall and the occurrence of hot spots on the wall quickly results.

It has been found that such channeling of hot gases may be prevented by providing a layer of compressible refractory cement between the outer course of insulating brick and the inner wall of the vessel and pretreating the refractory as hereinafter described.

My method for pretreating the refractory lining results in squeezing the refractory cement between the outer layer of refractory, i.e. the outer course of refractory bricks and the inner wall of the pressure vessel, forcing the cement into openings in and joints between the refractory bricks. This is accomplished by firing the reaction zone, preferably with hydrocarbon oil or gas and air, at substantially atmospheric pressure and thereby bringing the temperature of the interior of the reaction zone up to operating temperature within the range of 2000 to 3500° F. At these temperatures, the inner layer of brick, or refractory liner, is expanded to substantially the same extent that it is expanded during normal gas generation operations. However, since the refractory has a lower thermal conductivity in an atmosphere of flue gas at atmospheric pressure than in one of synthesis gas at elevated pressure, the wall of the pressure vessel is heated to a lower temperature than the temperature which prevails during normal operations. As a result, expansion of the pressure vessel wall is much less than its expansion during normal gas generation operation so that the cement is squeezed between the outer layer of refractory and the inner wall of the vessel, compressing the cement and causing it to flow into every available opening on the external surface of the bricks. This effects a gas-tight seal between the brickwork and the pressure vessel wall. On subsequent cooling, the seal between the inner wall of the vessel and outer layer of refractory bricks, i.e. the layer of bricks immediately adjacent the inner wall of the vessel, remains intact. This seal prevents subsequent channeling of hot gas along the wall of the vessel during normal operation of the apparatus for the generation of synthesis gas.

This invention will be more readily understood from the following detailed description.

The FIGURE is a partial elevational view in cross section showing the construction of a synthesis gas generator in accordance with the principles of this invention.

With reference to the drawing, the apparatus comprises a pressure vessel having a hollow pressure-resistant cylindrical steel shell 1 provided with a refractory liner. The refractory liner is suitably made up of concentric layers or courses of precast shapes, generally brickwork. The inner layer of refractory 2, defining the wall of the reaction zone, is a high temperature refractory material, suitably alumina of high purity and density. Surrounding the inner layer 2 is an intermediate layer of refractory material 3, suitably composed of high temperature alumina firebrick. Surrounding intermediate layer 3 is a concentric outer layer 4 of refractory insulating material, suitably alumina insulating brick. Other refractories may be used in place of alumina, e.g., mullite (a composite of alumina, silica, and titania), or magnesia. The refractory liner is substantially uniformly spaced from the inner wall of the reaction vessel by a layer of compressible insulating cement 6 approximately one-half inch to one inch in thickness.

Suitable cements are those composed of lead slag wool, asbestos, and fire clay. Ground asbestos mixed with equal parts by volume of high temperature, air-setting fire clay cement may also be used. Cements sold under the trade names A. P. Green Insulating Cement and Detrick No. 711 Cement have been found suitable for this purpose. These cements are sold as a powder which is mixed with water and troweled into place. The average density of the dry cement is about 22 to 24 pounds per cubic foot. These cements are very resilient and can be readily compressed when dry. Compressive strength is about 40 pounds per square inch. The K factor (atmospheric pressure) ranges from about 0.5 at 200° F. to about 1.3 at 1000° F. (B.t.u.'s per hour per square foot per ° F. per foot of thickness).

A flanged nozzle 7 is provided at the upper end of the shell to accommodate a suitable mixer-burner, not illustrated. Nozzle 7 is provided with a refractory line 8, preferably spaced from the inner surface of nozzle 7 and surrounded by compressible insulating cement, as illustrated. The transition from the nozzle to full reactor diameter is effected by suitably shaped precast refractory shapes 9. The refractory brickwork is capped by refractory cap 11. We have found that castable refractory, suitably any commercially available alumina castable is suitable for forming a cap 11, filling out the spaces above the brick as illustrated in the drawing, leaving a region between the cap and the shell which is filled with insulating cement. We have found that castable refractory also is suitable for forming a base, not illustrated in the drawing, to support the refractory brick.

The generator, with the refractory and compressible cement in place, is preconditioned prior to the production of carbon monoxide and hydrogen under elevated pressure therein by preheating the refractory to an elevated temperature within the range of normal operating temperature, i.e. within the range of 1800 to 3500° F. at substantially atmospheric pressure. The refractory is preferably preheated to a temperature in the range of 2500 to 3000° F. This preheating is preferably accomplished by firing the generator with air and oil or gas in proportions resulting in substantially complete combustion of the fuel. Preconditioning the refractory in this manner effects expansion of the refractory to substantially the full extent of its potential expansion at operating temperature. The steel shell of the generator is heated only to a relatively low temperature, e.g., 250° F., which is considerably lower than its normal operating temperature, e.g., 450° F. This difference in shell temperature is largely due to the effect of pressure and gas compositions on the K factors of the refractory materials, as explained above. In any event, the temperature of the shell, and hence its thermal expansion, is much lower during the preheat treatment than during normal operation. As a result, the cement is compressed between the refractory liner and the inner wall of the pressure vessel forming a permanent gas-tight seal. After preconditioning, as above described, the gas generator is put in operation, preferably without cooling, to produce carbon monoxide and hydrogen by partial combustion of fuel at a pressure above about 100, preferably above about 200, pounds per square inch gauge and at a temperature in the range of 1800 to 3500° F., preferably in the range of 2200 to 3000° F. The preconditioning treatment above described effectively protects the generator shell against the occurrence of hot spots from gas channeling during the high pressure, high temperature synthesis gas generation operations.

Obviously, many modifications and variations of the invention, as hereinbefore set forth, may be made without departing from the spirit and scope thereof, and therefore only such limitations should be imposed as are indicated in the appended claim.

I claim:

In a partial combustion furnace wherein high temperature gases comprising carbon monoxide and hydrogen are produced at an elevated temperature above about 2000° F. and an elevated pressure above about 100 pounds per square inch gauge in a reactor comprising a reaction zone of generally cylindrical form contained within a pressure vessel comprising a steel shell provided with a refractory brick liner spaced about ½ to about 1 inch from the inner wall of said shell, the method of forming a gas-tight seal between the outermost surface of said refractory brick liner and the inner wall of said pressure vessel shell which comprises applying a water-wet mixture of air-setting high temperature insulating cement to the inner wall of said pressure vessel and permitting said wet cement to set and dry to form a continuous layer of compressible cement filling the space between said liner and said shell, and preconditioning said reactor prior to the production of carbon monoxide and hydrogen under pressure within said reaction zone by heating said refractory to an elevated temperature within the range of normal operating temperatures at substantially atmospheric pressure by substantially complete combustion of hydrocarbon with air effecting expansion of said refractory and compression of said cement between said refractory and said shell of said vessel while said shell is at a temperature below normal operating temperature by an amount sufficient to force the dry cement into joints between the refractory brick and form a gas-tight seal between the brickwork and the vessel wall.

References Cited in the file of this patent

UNITED STATES PATENTS

| | | |
|---|---|---|
| 2,028,968 | Carlstrom | Jan. 28, 1936 |
| 2,230,141 | Hurer | Jan. 28, 1941 |
| 2,398,546 | Messmore | Apr. 16, 1946 |
| 2,605,174 | Krejci | July 29, 1952 |
| 2,731,466 | Heffner | Jan. 17, 1956 |
| 2,796,332 | Pollock | June 18, 1957 |
| 2,918,425 | Berger et al. | Dec. 22, 1959 |